(12) United States Patent
Ma

(10) Patent No.: US 12,289,518 B2
(45) Date of Patent: Apr. 29, 2025

(54) IMAGE PHOTOGRAPHING METHOD AND ELECTRONIC DEVICE

(71) Applicant: VIVO MOBILE COMMUNICATION CO., LTD., Guangdong (CN)

(72) Inventor: Ziping Ma, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 244 days.

(21) Appl. No.: 18/090,248

(22) Filed: Dec. 28, 2022

(65) Prior Publication Data

US 2023/0138495 A1 May 4, 2023

Related U.S. Application Data

(63) Continuation of application No. PCT/CN2021/102544, filed on Jun. 25, 2021.

(30) Foreign Application Priority Data

Jun. 29, 2020 (CN) .......................... 202010610622.1

(51) Int. Cl.
*H04N 23/63* (2023.01)
*H04N 5/265* (2006.01)
*H04N 23/45* (2023.01)

(52) U.S. Cl.
CPC ........... *H04N 23/632* (2023.01); *H04N 5/265* (2013.01); *H04N 23/45* (2023.01)

(58) Field of Classification Search
None
See application file for complete search history.

(56) References Cited

U.S. PATENT DOCUMENTS 9,571,732 B2 2/2017 Cho et al.
11,630,577 B2 * 4/2023 Chen ..................... G06F 1/3265
345/156

(Continued)

FOREIGN PATENT DOCUMENTS

CN 103813089 A 5/2014
CN 103813108 A 5/2014

(Continued)

OTHER PUBLICATIONS

English translation of KR 101678861 B1, Eum et al, 2016 (Year: 2016).*

(Continued)

*Primary Examiner* — James M Hannett
(74) *Attorney, Agent, or Firm* — BROOKS KUSHMAN P.C.

(57) ABSTRACT

An image photographing method and an electronic device, and the method includes: collecting M first images by using a camera in a first camera array, and collecting N second images by using a camera in a second camera array, where M is an integer greater than 1, and N is a positive integer; displaying P preview images, where each preview image is obtained by synthesizing an image in the M first images and an image in the N second images, synthesized images corresponding to different preview images are different, the synthesized image includes at least one of the following: the first image and the second image, and P is an integer greater than 1; and obtaining a corresponding final image based on a target image in the P preview images.

17 Claims, 3 Drawing Sheets

(56) References Cited

U.S. PATENT DOCUMENTS

| | | | |
|---|---|---|---|
| 2014/0132735 A1 | 5/2014 | Lee et al. | |
| 2014/0375760 A1* | 12/2014 | Lee | H04N 23/698 |
| | | | 348/36 |
| 2015/0138314 A1 | 5/2015 | Vincent | |
| 2015/0304557 A1 | 10/2015 | Choi | |
| 2016/0050408 A1 | 2/2016 | Lee et al. | |
| 2017/0034449 A1 | 2/2017 | Eum et al. | |
| 2018/0013945 A1 | 1/2018 | Ciurea et al. | |
| 2020/0036823 A1* | 1/2020 | Hsieh | H04M 1/0266 |
| 2020/0204738 A1 | 6/2020 | Peng | |
| 2020/0233543 A1* | 7/2020 | Lee | H04N 21/6582 |
| 2021/0014415 A1* | 1/2021 | Wei | H04N 23/45 |
| 2023/0046708 A1* | 2/2023 | Xu | G06F 3/04845 |

FOREIGN PATENT DOCUMENTS

| | | | |
|---|---|---|---|
| CN | 106791389 A | | 5/2017 |
| CN | 106888333 A | | 6/2017 |
| CN | 108924422 A | | 11/2018 |
| CN | 109040597 A | | 12/2018 |
| CN | 109242814 A | * | 1/2019 |
| CN | 109862258 A | | 6/2019 |
| CN | 110087056 A | | 8/2019 |
| CN | 110505411 A | | 11/2019 |
| CN | 210168114 U | | 3/2020 |
| CN | 111885285 A | | 11/2020 |
| JP | 2004159014 A | | 6/2004 |
| JP | 2004180107 A | | 6/2004 |
| KR | 20140060760 A | | 5/2014 |
| KR | 20160021497 A | | 2/2016 |
| KR | 101678861 B1 | * | 11/2016 |
| WO | 2019082925 A9 | | 5/2019 |

OTHER PUBLICATIONS

English translation of CN-109242814-A, Mai, 2019 (Year: 2019).*
First Office Action for Japanese Application No. 2022-581486, dated Jan. 30. 2024, 5 Pages.
First Office Action for Korean Application No. 10-2023-7001889, dated Mar. 13, 2024, 5 Pages.
Extended European Search Report for Application No. 21833388.8, dated Nov. 21, 2023, 8 Pages.
First Office Action for Chinese Application No. 202010610622.1, dated May 24, 2021, 6 Pages.
Journal of Jilin University (Engineering and Technology Edition), "Elemental image generation based on Maya", Jul. 2017, vol. 47. No. 4, 7 Pages.
International Search Report and Written Opinion for Application No. PCT /CN2021/102544, dated Sep. 27, 2021, 8 Pages.

* cited by examiner

IMAGE PHOTOGRAPHING METHOD AND ELECTRONIC DEVICE

CROSS-REFERENCE TO RELATED APPLICATIONS

This application is a continuation of International Application No. PCT/CN2021/102544 filed on Jun. 25, 2021, which claims priority to Chinese Patent Application No. 202010610622.1 filed on Jun. 29, 2020, which are incorporated herein by reference in their entireties.

TECHNICAL FIELD

This application pertains to the field of communication technologies, and specifically relates to an image photographing method and an electronic device.

BACKGROUND

With rapid development of communication technologies, electronic devices are increasingly widely used, and a performance requirement of a user on the electronic devices is also increasingly high.

Currently, the user may photograph a variety of images by using the electronic device, for example, photographing a group photo during a party with friends or photographing a landscape image during a trip. Photographing a group photo is used as an example. After a photographed person is in position, a photographer may adjust a position of the electronic device based on the standing position of the photographed person, to obtain a photographed group photo.

However, there is at least the following problem in the foregoing manner: When a relatively large quantity of photographers participate in photographing, the electronic device may not be able to photograph all photographed persons directly based on standing positions of the photographed persons, and therefore needs to adjust an angle of the electronic device or the standing positions of the photographed persons for multiple times, and consequently, an operation of photographing an image by the electronic device is relatively cumbersome.

SUMMARY

Embodiments of this application are to provide an image photographing method and an electronic device.

According to a first aspect, an embodiment of this application provides an image photographing method, and the method is applied to an electronic device. The electronic device includes a first camera array and a second camera array, the first camera array includes multiple cameras, and the second camera array includes at least one camera. The method includes: collecting M first images by using the camera in the first camera array, and collecting N second images by using the camera in the second camera array, where M is an integer greater than 1, and N is a positive integer; displaying P preview images, where each preview image is obtained by synthesizing an image in the M first images and an image in the N second images, synthesized images corresponding to different preview images are different, the synthesized image includes at least one of the following: the first image and the second image, and P is an integer greater than 1; and obtaining a corresponding final image based on a target image in the P preview images.

According to a second aspect, an embodiment of this application provides an electronic device, where the electronic device includes a first camera array and a second camera array, the first camera array includes multiple cameras, and the second camera array includes at least one camera. The electronic device includes a collection module, a display module, and an obtaining module.

The collection module is configured to collect M first images by using the camera in the first camera array, and collect N second images by using the camera in the second camera array, where M is an integer greater than 1, and N is a positive integer. The display module is configured to display P preview images, where each preview image is obtained by synthesizing an image in the M first images and an image in the N second images, synthesized images corresponding to different preview images are different, the synthesized image includes at least one of the following: the first image and the second image, and P is an integer greater than 1. The obtaining module is configured to obtain a corresponding final image based on a target image in the P preview images displayed by the display module.

According to a third aspect, an embodiment of this application provides an electronic device. The electronic device includes a processor, a memory, and a program or an instruction that is stored in the memory and that can run on the processor, and when the program or the instruction is executed by the processor, steps in the image photographing method according to the first aspect are implemented.

According to a fourth aspect, an embodiment of this application provides a readable storage medium. The readable storage medium stores a program or an instruction, and the program or the instruction is executed by a processor to implement steps in the image photographing method according to the first aspect.

According to a fifth aspect, an embodiment of this application provides a chip. The chip includes a processor and a communication interface, the communication interface is coupled to the processor, and the processor is configured to run a program or an instruction to implement steps in the image photographing method according to the first aspect.

DETAILED DESCRIPTION

The following clearly describes the technical solutions in the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art without creative efforts fall within the protection scope of this application.

Terms "first" and "second" in the specification and claims of this application are used to distinguish between similar objects, and do not need to be used to describe a specific order or sequence. It should be understood that data used in this way may be interchangeable in an appropriate case, so that the embodiments of this application can be implemented in a sequence other than those shown or described herein, and objects distinguished by "first" and "second" are generally of a same type, and a quantity of objects is not limited. For example, there may be one or more first targets. In addition, in the specification and the claims, "and/or" represents at least one of connected objects, and the character "/" generally represents an "or" relationship between associated objects.

In the embodiments of this application, words such as "exemplary" or "for example" are used to indicate an example, an instance, or descriptions. Any embodiment or design scheme described as "exemplary" or "an example" in the embodiments of this application should not be construed as being preferable or advantageous than other embodiments or design schemes. Specifically, the words such as "exemplary" or "for example" are used to present related concepts in a specific manner.

It should be noted that an image photographing method in embodiments of this application may be performed by an electronic device, a functional body or a functional entity in the electronic device, or an entity apparatus independent of the electronic device and used in the electronic device (for example, an entity apparatus externally mounted on the electronic device). This may be specifically determined according to an actual use requirement, and is not limited in this embodiment of this application. The electronic device is used as an example below to describe the image photographing method provided in the embodiments of this application.

With reference to the accompanying drawings, image photographing method provided in embodiments of this application is described in detail below by using a specific embodiment and an application scenario thereof.

Figure 1:
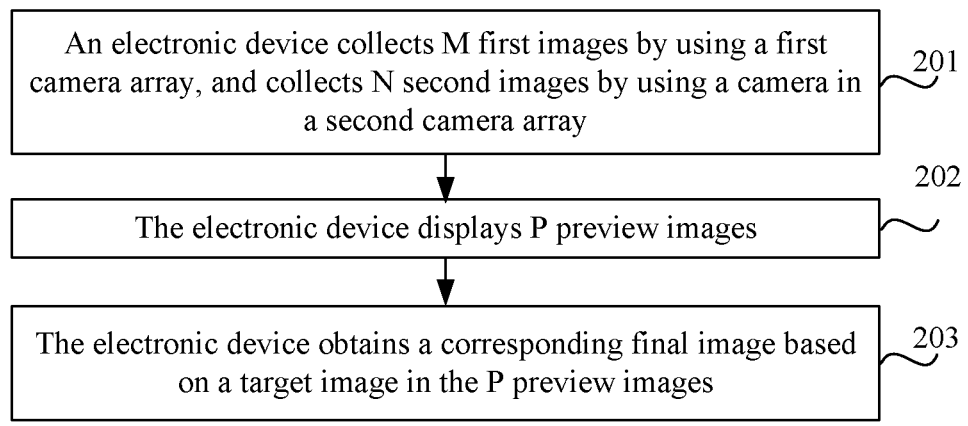
FIG. 1 is a schematic flowchart of an image photographing method according to an embodiment of this application.

As shown in FIG. 1, an embodiment of this application provides an image photographing method. The method is applied to an electronic device, the electronic device includes a first camera array and a second camera array, the first camera array includes multiple cameras, and the second camera array includes at least one camera. The method may include the following steps 201 to 203.

Step 201: The electronic device collects M first images by using the first camera array, and collects N second images by using a camera in a second camera array.

M is an integer greater than 1, and N is a positive integer.

In this embodiment of this application, in a process of photographing an image by using the electronic device, the electronic device may separately collect images by using the camera in the first camera array and the camera in the second camera array, and then the electronic device may display a preview image obtained by synthesizing images in these images.

Optionally, in this embodiment of this application, a screen of the electronic device may be a single-sided screen, a double-sided screen, a multi-sided screen, a folding screen, or a pull-out screen. This may be specifically determined according to an actual use requirement, and is not limited in this embodiment of this application.

Optionally, in this embodiment of this application, the first camera array and the second camera array may be distributed on a same screen of the electronic device, or may be distributed on different screens of the electronic device. Specifically, the first camera array and the second camera array may be determined according to an actual use requirement. This is not limited in this embodiment of this application.

Optionally, in this embodiment of this application, the first camera array and the second camera array may be camera arrays of a same size, or may be camera arrays of different sizes. Specifically, this may be determined according to an actual use requirement, and is not limited in this embodiment of this application.

In this embodiment of this application, both the first camera array and the second camera array may be 1×2 camera arrays, or both may be 2×2 camera arrays. The first camera array may be a 2×3 camera array, the second camera array may be a 1×3 camera array, or the like. This may be specifically determined according to an actual use requirement, and is not limited in this embodiment of this application.

It should be noted that, the foregoing "a×b" camera array means a camera array in which one row includes "a" cameras and one column includes "b" cameras. For example, the 1×2 camera array may be a camera array in which one row includes one camera and one column includes two cameras.

Figure 2:
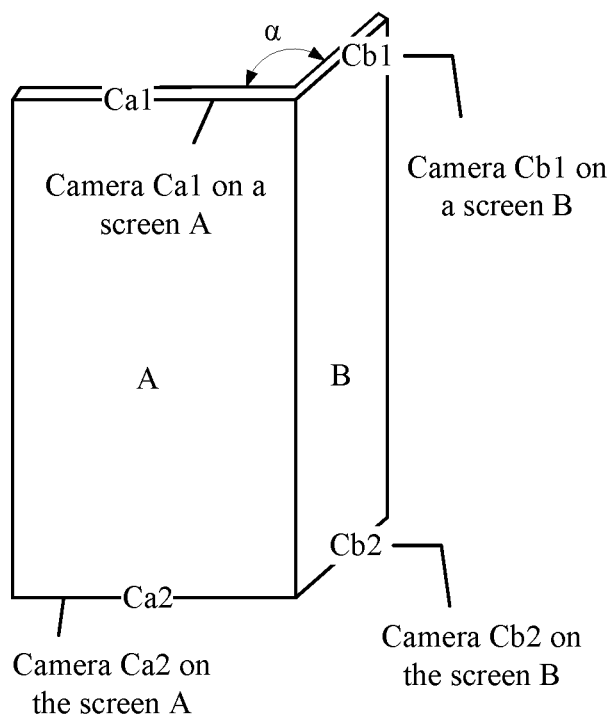
FIG. 2 is a first schematic diagram of camera distribution according to an embodiment of this application.

For example, when the screen of the electronic device is a folding screen, and both the first camera array and the second camera array are 1×2 camera arrays, the electronic device may be an electronic device shown in FIG. 2. Specifically, the first camera array may be a camera array formed by a camera Ca1 and a camera Ca2 shown in FIG. 2, and the second camera array may be a camera array formed by a camera Cb1 and a camera Cb2.

It should be noted that examples in this embodiment of this application are described by using an example in which both the first camera array and the second camera array are 1×2 camera arrays. An implementation in which the first camera array and the second camera array are other camera arrays is similar to the implementation in which both the first camera array and the second camera array are 1×2 camera arrays. To avoid repetition, details are not described in this embodiment of this application.

Optionally, in this embodiment of this application, the second camera array may alternatively be a 1×1 camera array. In this case, both M and N are 1.

Figure 3:
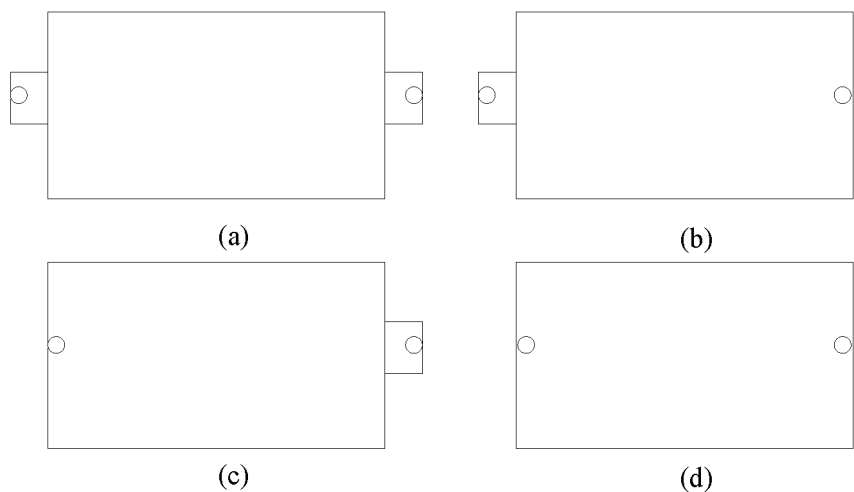
FIG. 3 is a second schematic diagram of camera distribution according to an embodiment of this application.

For example, when the second camera array is a 1×1 camera array, the electronic device may be an electronic device, shown in (a) in FIG. 3, on which a pop-up camera is disposed on both the top and the bottom, an electronic device, shown in (b) in FIG. 3, on which a pop-up camera is disposed on the top and an under display camera is disposed on the bottom, an electronic device, shown in (c) in FIG. 3, on which an under display camera is disposed on the top and a pop-up camera is disposed on the bottom, or an electronic device, shown in (d) in FIG. 3, on which an under display camera is disposed may be disposed on both the top and the bottom.

Optionally, in this embodiment of this application, the electronic device may collect images by using all cameras in the first camera array, or may collect images by using some cameras in the first camera array. This may be specifically determined according to an actual use requirement, and is not limited in this embodiment of this application.

Correspondingly, the electronic device may collect images by using all cameras in the second camera array, or may collect images by using some cameras in the second camera array.

Step 202: The electronic device displays P preview images.

Each preview image in the P preview images is obtained by synthesizing an image in the M first images and an image in the N second images, synthesized images corresponding to different preview images are different, the synthesized image includes at least one of the following: the first image and the second image, and P is an integer greater than 1.

In this embodiment of this application, after collecting the M first images and the N second images, the electronic device synthesizes images in these images to form preview images, so that the P preview images can be displayed.

In this embodiment of this application, a quantity of the P preview images may be determined based on a quantity of cameras that collect the first image and a quantity of cameras that collect the second image, that is, the quantity of the P preview images may be determined based on a quantity of first images and a quantity of second images.

Optionally, in this embodiment of this application, one preview image may be obtained by synthesizing first images collected by cameras in different columns in the first camera array and second images collected by cameras in different columns in the second camera array.

For example, when the first camera array is a 1×2 camera array, and the second camera array is a 1×1 camera array, that is, there are two first images (that is, M=2) and one second image (that is, N=1), the P preview images may be two preview images.

For another example, when the first camera array is a 1×2 camera array, and the second camera array is a 1×2 camera array, there may be three first images (that is, M=3), and there may be three second images (that is, N=3). In this case, the P preview images may be 28 preview images, for example, the first camera array is a 1×2 camera array, and collected images are a1, a2, and a3, where a1 and a2 are images obtained by using one camera in the first camera array, and a3 is an image obtained by using two cameras in the first camera array. Similarly, the second camera array is a 1×2 camera array, and collected images are b1, b2, and b3, where b1 and b2 are images collected by using one camera in the second camera array, and b3 is an image obtained by using two cameras in the second camera array. In this case, the P preview images may be a1b1, a1b2, a1b3, a2b1, a2b2, a2b3, a3b1, a3b2, a3b3, a1a2b1, a1a2b2, a1a2b3, a1a2a3, b1b2b3, or the like.

For another example, the first camera array is a 2×3 camera array, and the second camera array is a 1×3 camera array. In this case, there may be six first images (that is, M=6), and there are three second images (that is, N=3). In this case, the P preview images may be 27 preview images. Each preview image may be obtained by synthesizing two first images and one second image, and cameras that collect the two first images are distributed in different columns of the first camera array.

Optionally, in this embodiment of this application, step 202 may be specifically implemented by using step 202a.

Step 202a: The electronic device displays the P preview images in a first display area, and arranges and displays thumbnails of the P preview images in a second display area.

In this embodiment of this application, after the electronic device obtains the P preview images, the electronic device may display the P preview images in the first display area, and arrange and display the thumbnails of the P preview images in the second display area, so that the preview images can be clearly displayed to a user.

Optionally, in this embodiment of this application, the first display area and the second display area may be different display areas of a same screen of the electronic device, or may be display areas of different screens of the electronic device, or may be display areas formed by different screens of the electronic device. This may be specifically determined according to an actual use requirement, and is not limited in this embodiment of this application.

For example, it is assumed that the screen of the electronic device is a folding screen, the first display area may be a display area formed by combining a main screen and an upper-half screen of a secondary screen, and the second display area may be a display area formed by combining the main screen and a lower-half screen of the secondary screen.

Optionally, in this embodiment of this application, the electronic device may display images in the P preview images one by one in the first display area.

Optionally, in this embodiment of this application, the electronic device may display the thumbnails of the P preview images in sequence in the second display area.

Figure 4:
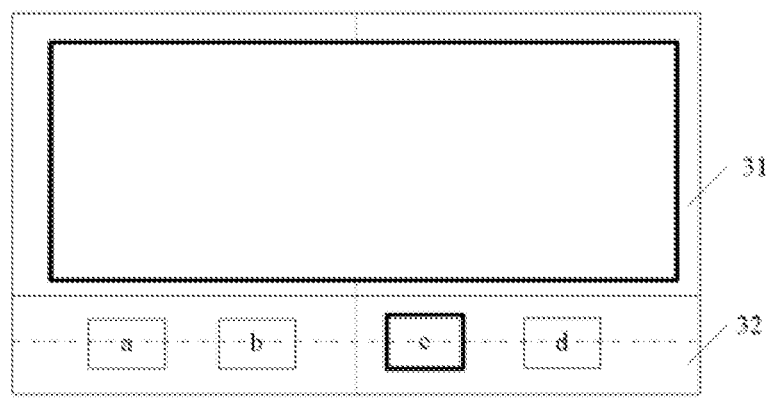
FIG. 4 is a schematic diagram of an interface to which an image photographing method is applied according to an embodiment of this application.

For example, it is assumed that a quantity of the P preview images is 4, and the P preview images are respectively a preview image a, a preview image b, a preview image c, and a preview image d. In this case, as shown in FIG. 4, the electronic device may display the preview image a, the preview image b, the preview image c, and the preview image d one by one in a display area 31, and arrange and display a thumbnail of the preview image a, a thumbnail of the preview image b, a thumbnail of the preview image c, and a thumbnail of the preview image d in sequence in a display area 32.

Optionally, in this embodiment of this application, when the electronic device displays a preview image in the first display area, the electronic device may display a thumbnail of the preview image in a preset display state (for example, a highlighted display state) in the second display area.

In this embodiment of this application, the electronic device may display the preview images or the thumbnails of the preview images in different display areas. Therefore, on one hand, the electronic device may clearly display these preview images to the user, and on the other hand, may display a quantity of preview images to the user, so that the user selects, from the preview images, a preview image that meets a use requirement of the preview image. In this way, the electronic device can obtain a corresponding final image based on the preview image.

Optionally, in this embodiment of this application, a step in which the electronic device displays the P preview images in the first display area may be specifically implemented by using the following step A and step B.

Step A: The electronic device obtains a line-of-sight angle of a target object in the preview image displayed in the first display area.

Step B: The electronic device updates display of an image in the P preview images in the first display area based on a change of the line-of-sight angle of the target object.

In this embodiment of this application, the electronic device may follow movement of the line-of-sight of the target object (that is, a change of a line-of-sight angle of the target object) to update the preview image displayed in the first display area.

In this embodiment of this application, the target object may be an object at an intermediate position in a to-be-photographed object or an object closest to the electronic device.

Certainly, in actual implementation, the target object may be any other possible object. Specifically, this may be determined according to an actual use requirement, and is not limited in this embodiment of this application.

In this embodiment of this application, the electronic device may calculate the line-of-sight angle of the target object by using a line-of-sight tracking algorithm.

Optionally, in this embodiment of this application, a speed (or a frequency) at which the electronic device updates the preview image displayed in the first display area may be determined based on a change of a line-of-sight angle of the target object (that is, a moving speed of the line-of-sight of the target object). Specifically, when the line-of-sight angle of the target object changes, the electronic device may update the preview image displayed in the first display area.

Step 203: The electronic device obtains a corresponding final image based on a target image in the P preview images.

It may be understood that the final image obtained by the electronic device is the same as an image parameter of the target image.

In this embodiment of this application, after the electronic device displays the P preview images, the electronic device may obtain the corresponding final image based on the target image in the P preview images.

Optionally, in this embodiment of this application, a manner in which the electronic device obtains the final image may include two possible implementations: a first manner and a second manner. The two manners are separately described below by using examples.

In the first manner, the electronic device directly stores the target image, to obtain the final image.

In the second manner, the electronic device uses the target camera to obtain the final image through photographing. The target camera may include a camera that collects and synthesizes an image of the target image (which may be specifically the first image and the second image for synthesizing the target image).

Optionally, in this embodiment of this application, the target image may be an image selected by the user from the P preview images, or may be an image selected by the electronic device from the P preview images. Specifically, this may be determined according to an actual use requirement, and is not limited in this embodiment of this application.

Optionally, in this embodiment of this application, step 203 may be specifically implemented by using step 203*a* and step 203*b*.

Step 203*a*: The electronic device determines whether the target image meets a target condition.

The target condition may be any one of the following: a selected input is received, display duration is greater than or equal to a first threshold, duration in which the line-of-sight of the target object stays on the target image is greater than or equal to a second threshold, or image quality is the best in the P preview images.

Step 203*b*: The electronic device obtains the corresponding final image based on the target image in a case that the target image meets the target condition.

In this embodiment of this application, the electronic device may determine whether an image in the P preview images meets the target condition. If a preview image meets the target condition, the preview image is the target image, so that the electronic device may obtain the corresponding final image based on the target image.

It may be understood that the target image may be a preview image that meets the target condition in the P preview images.

In this embodiment of this application, when the electronic device receives an input to the target image or the duration in which the line-of-sight stays at the target object is greater than or equal to the second threshold, the electronic device may determine that the user chooses to obtain the final image based on the target image; and when duration in which the electronic device displays the target image is greater than the first threshold, the electronic device may determine that the user selects, by default, to photograph the target image based on a parameter of the target image.

Optionally, in this embodiment of this application, when the line-of-sight of the target object stays on a thumbnail of a preview image in the P preview images for a period of time t, if t is greater than or equal to the second threshold, the electronic device may determine that the preview image is selected for a photographed object, so that the electronic device may obtain the corresponding final image based on the preview image.

Optionally, in this embodiment of this application, for the foregoing "image quality of the target image is the best in the P preview images", after the electronic device displays the P preview images, the electronic device may determine, based on image quality of the P preview images, a preview image with best image quality as the target image.

Optionally, in this embodiment of this application, the image quality of the preview image may be determined based on at least one of the following parameters: brightness of the preview image, light brightness of the preview image, a degree of visualization of the preview image, or a grayscale of the preview image.

In this embodiment of this application, the received first input for the target image, the display duration of the target image, and the duration in which the line-of-sight of the target object stays on the target image may reflect that an image that the user wants to obtain is the same as the target image, and the image quality of the target image is the best in the P preview images and can reflect the best image effect of the target image. Therefore, when the electronic device obtains the corresponding final image based on the target image, an image satisfactory to the user or an image with the best image effect may be directly obtained, so that image photographing efficiency of the electronic device can be improved.

An embodiment of this application provides an electronic device. Because cameras in different camera arrays in an electronic device have different viewing positions and angles, in a process of photographing an image by the electronic device, cameras in different camera arrays are used to collect images, so that images in different ranges can be collected. In this way, when an image obtained by using a camera in a first camera array and an image obtained by a camera in a second camera array by the electronic device are synthesized into a preview image, the synthesized preview image may include an image with a larger view finding range, so that content of a final image obtained by the electronic device based on the preview image is relatively complete. In this way, according to the image photographing method provided in embodiments of this application, in an image photographing process, an image with relatively complete content can be photographed without adjusting the angle of the electronic device or the standing position of the photographed person, so that an operation of photographing an image by the electronic device can be simplified.

Optionally, in this embodiment of this application, before the electronic device collects the M first images by using the camera in the first camera array, and collects the N second images by using the camera in the second camera array, the electronic device may first obtain an image (for example, a third image in this embodiment of this application) collected by one camera (for example, the first camera in this embodiment of this application) in the electronic device, and obtain a change rate of image content of the image. If a change frequency of the image content of the image is relatively large, the electronic device may determine that one camera (that is, a single camera) cannot completely obtain a to-be-photographed image (in other words, a single camera does not have a full view), and the electronic device may use cameras in multiple camera arrays in the electronic device to collect images, so that the M first images and the N second images may be collected.

In this embodiment of this application, before step 201, the image photographing method provided in this embodiment of this application may further include the following step 204 to step 206.

Step 204: The electronic device collects a third image by using the first camera in the first camera array.

Optionally, in this embodiment of this application, the first camera may be a primary camera (for example, a primary front-facing camera or a primary rear-facing camera) in the electronic device, or may be a camera selected by the electronic device when triggered by the user. Specifically, the first camera may be determined according to an actual use requirement, and this is not limited in this embodiment of this application.

An example in which a screen of the electronic device is a folding screen and the first camera is a primary front-facing camera is used below to describe a manner in which the first camera collects the third image.

S1: Unfold the folding screen of the electronic device.

Specifically, the user picks up and gradually unfolds the folding screen of the electronic device, a placement state of the electronic device changes from horizontal to vertical, and the front-facing camera faces the user.

S2: Raise a wrist to light up a screen and arouse face recognition.

Specifically, when detecting that the user has an action of raising the wrist, the electronic device enables a face recognition unlock function of the electronic device, and quickly lights up the screen of the electronic device, to be prepared for the user to use a selfie function of the electronic device.

S3: Calculate a height of the electronic device from the ground and a lifting acceleration.

Specifically, the electronic device obtains the height of the electronic device from the ground based on a high-precision height sensor, and obtains, based on the acceleration sensor, the acceleration at which the electronic device is lifted (an acceleration in a time period from time when the user lifts the electronic device to still). When the height of the electronic device exceeds a height threshold and the acceleration exceeds an acceleration threshold, the electronic device may determine that the user wants to make a selfie, that is, determine that it is a selfie mode.

S4: The electronic device enables a front-facing camera of a primary screen (that is, the foregoing primary front-facing camera).

Specifically, based on S3, the electronic device sets a frame rate and photo resolution of the front-facing camera of the primary screen to maximum values, and enables the front-facing camera of the primary screen (for example, a camera Ca1 shown in FIG. 2), so that an operation in which the user triggers the electronic device to enable the camera can be simplified.

S5: Record a captured human face.

Specifically, after the electronic device enables the front-facing camera on the primary screen, the front-facing camera may obtain a human scene in a current viewing frame based on an artificial intelligence algorithm, an eye focus algorithm, and a face focus algorithm of the camera, so that the third image may be collected.

Step 205: The electronic device obtains a change frequency of image content of the third image.

In this embodiment of this application, before the electronic device collects the M first images by using the camera in the first camera array, and collects the N second images by using the camera in the second camera array, the electronic device may first collect the third image by using the foregoing first camera module, and then obtain the change frequency of the image content of the third image.

Optionally, in this embodiment of this application, step 205 may be specifically implemented by using step 205*a*.

Step 205*a*: The electronic device obtains a change frequency of target information in the image content.

The target information may include at least one of the following: a to-be-photographed object in the third image or a quantity of to-be-photographed objects in the third image.

In this embodiment of this application, the electronic device may parse the third image, to obtain the to-be-photographed object in the third image and/or the quantity of to-be-photographed objects, and determine whether the to-be-photographed object and/or the quantity of to-be-photographed objects changes, so as to determine the change frequency of the image content of the third image.

For example, when multiple people are photographed, the device is adjusted, so that the device enables the camera to shoot all people as far as possible. In an adjustment process, a to-be-photographed object may change or the quantity of to-be-photographed objects may change.

Step 206: The electronic device determines whether the change frequency of the image content of the third image is greater than or equal to a third threshold.

In this embodiment of this application, after the electronic device obtains the change frequency of the image content of the third image, if the change frequency of the image content of the third image is greater than or equal to the third threshold, the electronic device may determine that the first camera cannot obtain an image of all the to-be-photographed objects, that is, a single-camera does not have a full view, so that the electronic device may collect the M first images by using the camera in the first camera array, and collect the N second images by using the camera in the second camera array. If the change frequency of the image content of the third image is less than the third threshold, the electronic device may determine that the first camera can collect an image of all the to-be-photographed objects, so that the electronic device may shoot an image by using the first camera.

In this embodiment of this application, the cameras in the first camera array may include the first camera.

In this embodiment of this application, before the electronic device collects the M first images by using the camera in the first camera array and collect the N second images by using the camera in the second camera array, the electronic device may first obtain the third image by using the first camera, and obtain the change frequency of the image content of the third image, to determine whether a single camera can collect a complete image of the to-be-photographed object, thereby avoiding starting an unnecessary camera and further reducing power consumption.

Optionally, in this embodiment of this application, in a case that the electronic device includes a first screen and a second screen, and in a case that the electronic device determines that the change frequency of the image content of the third image is greater than or equal to the third threshold, the electronic device may determine an angle between the first screen and the second screen, to determine whether cameras distributed on different screens are used together to collect an image.

In this embodiment of this application, before the electronic device collects the M first images by using the camera in the first camera array and collects the N second images by using the camera in the second camera array, the image photographing method provided in this embodiment of this application may further include the following step 207.

Step 207: The electronic device determines whether an angle between the first screen and the second screen of the electronic device is greater than or equal to a fourth threshold.

In this embodiment of this application, in a case that the electronic device includes the first screen and the second screen, when the electronic device determines that the change frequency of the image content of the third image is greater than or equal to the third threshold, the electronic device may determine, based on the angle between the first screen and the second screen, whether cameras in camera arrays distributed on different screens can be used together to collect a complete image of the to-be-photographed object. Specifically, when the angle between the first screen and the second screen is greater than or equal to the fourth threshold, the electronic device may determine that cameras in camera arrays distributed on different screens can be used together to collect a complete image of the to-be-photographed object, so that the electronic device may collect the M first images by using the camera in the first camera array, and collect the N second images by using the camera in the second camera array; and when the angle between the first screen and the second screen is less than the fourth threshold, the electronic device may determine that even if cameras in camera arrays distributed on different screens are used together, a complete image of the to-be-photographed object cannot be collected, so that the electronic device may remind the user to adjust the angle between the first screen and the second screen or an angle of the electronic device.

The first camera array and the second camera array may be respectively distributed on the first screen and the second screen of the electronic device.

Optionally, in this embodiment of this application, the screen of the electronic device may be a folding screen, the first screen may be a primary screen of the electronic device, and the second screen may be a secondary screen of the electronic device. The angle between the first screen and the second screen may be a folding angle of the folding screen.

It should be noted that, in this embodiment of this application, the folding angle of the folding screen may be an unfolding angle of the secondary screen of the electronic device relative to the primary screen of the electronic device.

For example, the folding angle of the folding screen may be a folding angle α shown in FIG. 2.

In this embodiment of this application, when the electronic device includes the first screen and the second screen, the angle between the first screen and the second screen may reflect viewing ranges of cameras in camera arrays distributed on different screens. Therefore, the electronic device may determine, based on the angle between the first screen and the second screen, whether to use the cameras in the camera arrays distributed on different screens together to collect an image. Therefore, a case that because the angle between the first screen and the second screen is insufficient, cameras in multiple camera arrays cannot collect a complete image of the to-be-photographed can be avoided, thereby avoiding waste of power.

Optionally, in this embodiment of this application, before step 202, the image photographing method provided in this embodiment of this application may further include the following step 208 and step 209.

Step 208: The electronic device combines the M first images and the N second images into P image sets.

Each of the P image sets may include different first images and/or second images.

In this embodiment of this application, before the electronic device displays the P preview images, the electronic device may first combine the M first images and the N second images into the P image sets, so that the electronic device may process each image set in the P image sets to obtain the P preview images.

For example, as shown in FIG. 2, it is assumed that an image collected by a camera Ca1 is recorded as an image A1, an image collected by a camera Ca2 is recorded as an image A2, an image collected by a camera Cb1 is recorded as an image B1, and an image collected by a camera Cb2 is recorded as an image B2, where the image A1 and the image A2 may be the first image, and the image B1 and the image B2 may be the second image. Therefore, four image sets formed by these images may be an image set (image A1, image B1), an image set (image A1, image B2), an image set (image A2, image B1), and an image set (image A2, image B2).

Step 209: The electronic device performs target processing on an image in each image set, and merges processed images to obtain the P preview images.

The target processing includes at least one of macro block de-duplication, pixel de-duplication, or de-marginalization (which may also be referred to as marginalization).

In this embodiment of this application, for each image set in the P image sets, the electronic device may perform target processing on an image in each image set, and then merge processed images to obtain the P preview images.

It should be noted that, in this embodiment of this application, for one image set (any one of the P image sets), the electronic device may perform target processing on all images in the image set, and then merge all processed images to obtain one preview image.

In this embodiment of this application, the macro block de-duplication may be de-duplication of an image area, and the pixel de-duplication may be de-duplication of a single pixel in the image. The macro block de-duplication has a coarser de-duplication granularity and high de-duplication efficiency, and the pixel de-duplication has a finer granularity and a good de-duplication effect.

Optionally, in this embodiment of this application, the de-duplication granularity (that is, a macro block size) of the macro block de-duplication may be determined based on a size of the image. For example, the macro block size may be 32×32 pixels.

Optionally, in this embodiment of this application, the electronic device may perform macro block de-duplication on the image, and then perform pixel de-duplication on an area that is less than the macro block size.

In this embodiment of this application, the electronic device may perform de-marginalization processing on images in an image set, so that these images are more naturally fused into a preview image.

In this embodiment of this application, the electronic device may perform target processing on images in an image set, so that a final image obtained through combination can be more natural, and quality of an image synthesized by the electronic device can be improved.

Figure 5:
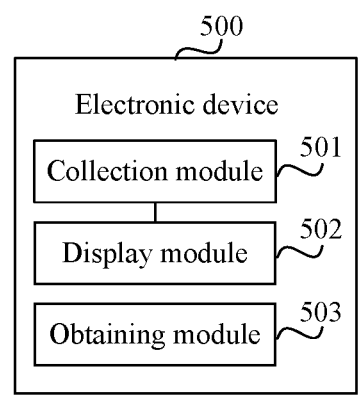
FIG. 5 is a schematic diagram of a structure of an electronic device according to an embodiment of this application.

As shown in FIG. 5, this application provides an electronic device 500. The electronic device 500 includes a first camera array and a second camera array, the first camera array includes multiple cameras, and the second camera array includes at least one camera. The electronic device 500 includes a collection module 501, a display module 502, and an obtaining module 503. The collection module 501 is configured to collect M first images by using the camera in the first camera array, and collect N second images by using the camera in the second camera array, where M is an integer greater than 1, and N is a positive integer. The display module 502 is configured to display P preview images, where each preview image is obtained by synthesizing an image in the M first images and an image in the N second images collected by the collection module 501, synthesized images corresponding to different preview images are different, the synthesized image includes at least one of the following: the first image and the second image, and P is an integer greater than 1. The obtaining module 503 is configured to obtain a corresponding final image based on a target image in the P preview images displayed by the display module 502.

This embodiment of this application provides an electronic device. Because cameras in different camera arrays in an electronic device have different viewing positions and angles, in a process of photographing an image by the electronic device, cameras in different camera arrays are used to collect images, so that images in different ranges can be collected. In this way, when an image obtained by using a camera in a first camera array and an image obtained by a camera in a second camera array by the electronic device are synthesized into a preview image, the synthesized preview image may include an image with a larger view finding range, so that content of a final image obtained by the electronic device based on the preview image is relatively complete. In this way, according to the image photographing method provided in embodiments of this application, in an image photographing process, an image with relatively complete content can be photographed without adjusting the angle of the electronic device or the standing position of the photographed person, so that an operation of photographing an image by the electronic device can be simplified.

Optionally, the obtaining module is specifically configured to obtain the corresponding final image based on the target image in a case that the target image meets a target condition. The target condition is any one of the following: a selected input is received, display duration is greater than or equal to a first threshold, duration in which the line-of-sight of the target object stays on the target image is greater than or equal to a second threshold, or image quality is the best in the P preview images.

This embodiment of this application provides an electronic device. The received first input for the target image, the display duration of the target image, and the duration in which the line-of-sight of the target object stays on the target image may reflect that an image that a user wants to obtain is the same as the target image, and the image quality of the target image is the best in the P preview images and can reflect the best image effect of the target image. Therefore, when the electronic device obtains the corresponding final image based on the target image, an image satisfactory to the user or an image with the best image effect may be directly obtained, so that image photographing efficiency of the electronic device can be improved.

Optionally, the collection module is further configured to: before collecting the M first images and collecting the N second images, collect a third image by using a first camera in the first camera array. The obtaining module is further configured to obtain a change frequency of image content of the third image. The collection module is specifically configured to: in a case that the change frequency of the image content of the third image is greater than or equal to a third threshold, collect the M first images by using the camera in the first camera array, and collect the N second images by using the camera in the second camera array.

This embodiment of this application provides an electronic device. Before the electronic device collects the M first images by using the camera in the first camera array and collect the N second images by using the camera in the second camera array, the electronic device may first obtain the third image by using the first camera, and obtain the change frequency of the image content of the third image, to determine whether a single camera can collect a complete image of a to-be-photographed object, thereby avoiding starting an unnecessary camera and further reducing power consumption.

Optionally, the obtaining module is specifically configured to obtain a change frequency of target information in the image content, where the target information includes at least one of the following: a to-be-photographed object in the third image or a quantity of to-be-photographed objects in the third image.

Optionally, the electronic device includes a first screen and a second screen. The collection module is specifically configured to: in a case that the change frequency of the image content of the third image is greater than or equal to the third threshold and an angle between the first screen and the second screen is greater than or equal to a fourth threshold, collect the M first images by using the camera in the first camera array, and collect the N second images by using the camera in the second camera array; where the first camera array and the second camera array are respectively distributed on the first screen and the second screen of the electronic device.

This embodiment of this application provides an electronic device. When the electronic device includes the first screen and the second screen, the angle between the first screen and the second screen may reflect viewing ranges of cameras in camera arrays distributed on different screens. Therefore, the electronic device may determine, based on the angle between the first screen and the second screen, whether to use the cameras in the camera arrays distributed on different screens together to collect an image. Therefore, a case that because the angle between the first screen and the second screen is insufficient, cameras in multiple camera arrays cannot collect a complete image of the to-be-photographed can be avoided, thereby avoiding waste of power.

Optionally, the display module is specifically configured to display the P preview images in a first display area, and arrange and display thumbnails of the P preview images in a second display area.

This embodiment of this application provides an electronic device. The electronic device may display the preview images or the thumbnails of the preview images in different display areas. Therefore, on one hand, the electronic device may clearly display these preview images to the user, and on the other hand, may display a quantity of preview images to the user, so that the user selects, from the preview images, a preview image that meets a use requirement of the preview image. In this way, the electronic device can obtain a corresponding final image based on the preview image.

Optionally, the display module includes an obtaining submodule and an updating submodule. The obtaining submodule is configured to obtain a line-of-sight angle of a target object in the preview image displayed in the first display area. The updating submodule is configured to update display of an image in the P preview images in the first display area based on a change of the line-of-sight angle of the target object obtained by the obtaining submodule.

Optionally, the electronic device further includes a combining module, a processing module, and a merging module. The combining module is configured to: before the display module displays the P preview images, combine the M first images and the N second images into P image sets, where each image set includes different first images and/or second images. The processing module is configured to perform target processing on an image in each image set obtained through combining by the combining module. The merging module is configured to merge images processed by the processing module, to obtain the P preview images, where the target processing includes at least one of macro block de-duplication, pixel de-duplication, or de-marginalization.

This embodiment of this application provides an electronic device. The electronic device may perform target processing on images in an image set, so that a final image obtained through combination can be more natural, and quality of an image synthesized by the electronic device can be improved.

The electronic device in this embodiment of this application may be an apparatus, or may be a component, an integrated circuit, or a chip in the electronic device. The apparatus may be a mobile electronic device, or may be a non-mobile electronic device. For example, the mobile electronic device may be a mobile phone, a tablet computer, a notebook computer, a palmtop computer, a vehicle-mounted terminal device, a wearable device, an ultra-mobile personal computer (UMPC), a netbook, or a personal digital assistant (PDA), and the non-mobile terminal device may be a personal computer (PC), a television (TV), a counter, or a self-service computer. This is not specifically limited in this embodiment of this application.

The electronic device in this embodiment of this application may be an apparatus with an operating system. The operating system may be an Android operating system, may be an iOS operating system, or may be another possible operating system. This is not specifically limited in this embodiment of this application.

The electronic device provided in this embodiment of this application can implement processes implemented by the electronic device in the method embodiments of FIG. 1 to FIG. 4. To avoid repetition, details are not described herein again.

Figure 6:
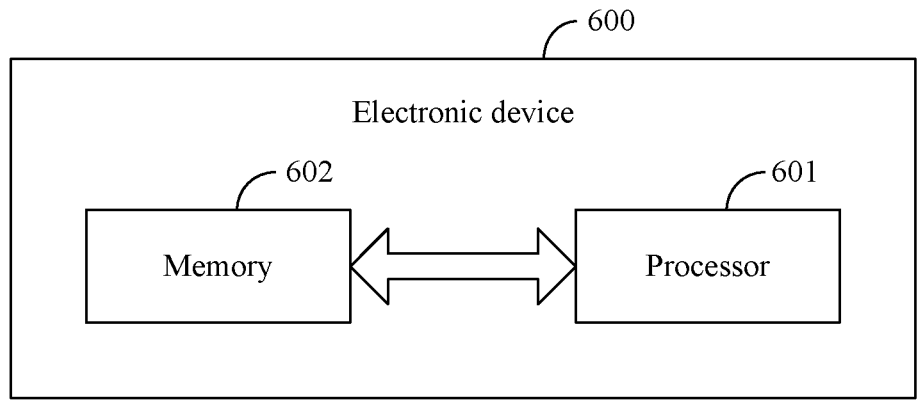
FIG. 6 is a schematic diagram of an architecture of an electronic device according to an embodiment of this application.

Optionally, as shown in FIG. 6, an embodiment of this application further provides an electronic device 600, including a processor 601, a memory 602, and a program or an instruction that is stored in the memory 602 and that can run on the processor 601. When the program or the instruction is executed by the processor 601, processes of the embodiments of the image photographing method can be implemented, and a same technical effect can be achieved. To avoid repetition, details are not described herein.

It should be noted that the electronic device in this embodiment of this application includes the foregoing mobile electronic device and the foregoing non-mobile electronic device.

Figure 7:
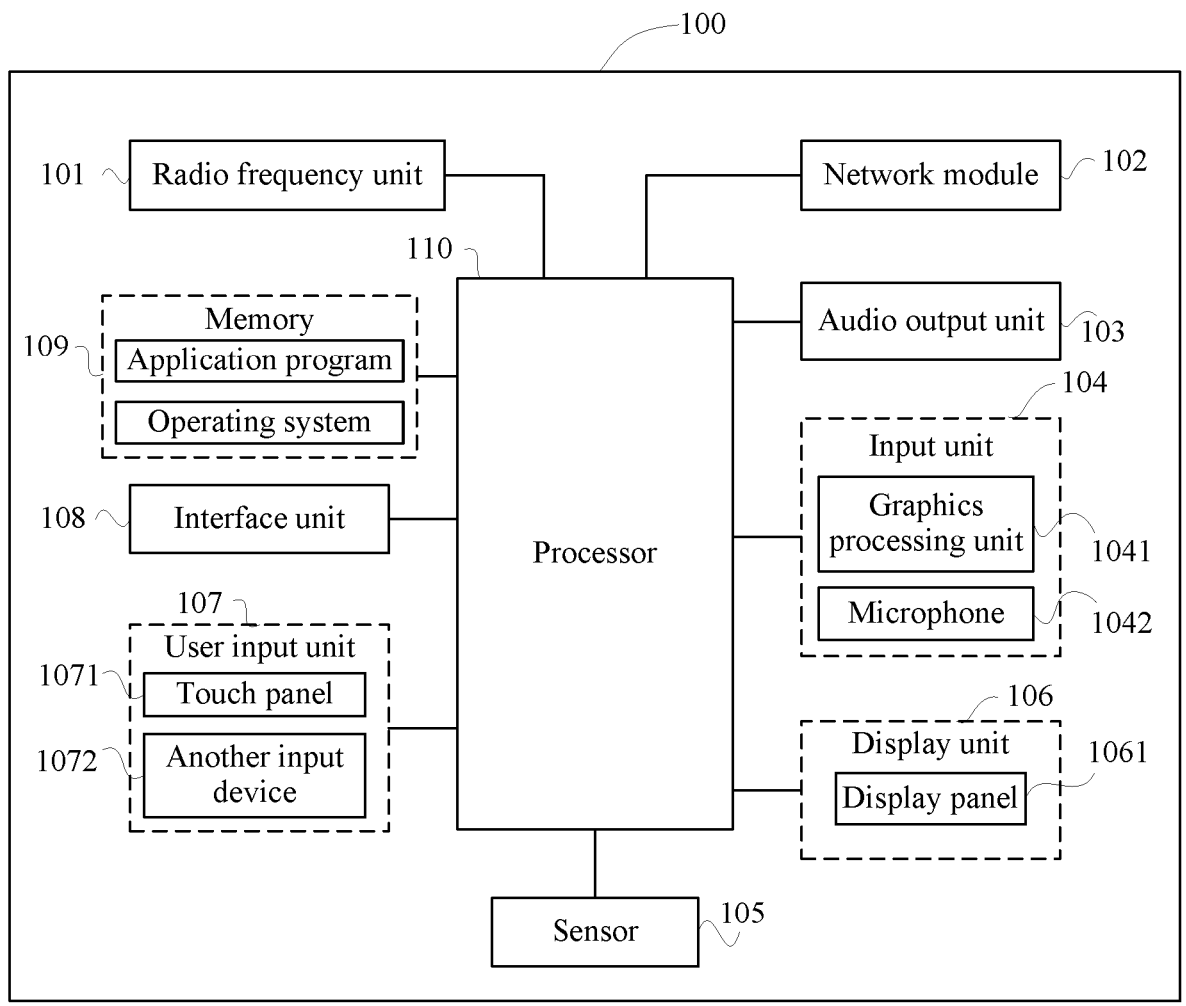
FIG. 7 is a schematic diagram of hardware of an electronic device according to an embodiment of this application.

FIG. 7 is a schematic diagram of a hardware structure of an electronic device for implementing embodiments of this application.

The electronic device 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

It may be understood by a person skilled in the art that the electronic device 100 may further include a power supply (such as a battery) that supplies power to each component. The power supply may be logically connected to the processor 110 by using a power management system, to implement functions such as charging, discharging, and power consumption management by using the power management system. A structure of the electronic device shown in FIG. 7 does not constitute a limitation on the electronic device, and may include more or fewer parts than those shown in the figure, or combine some components, or have different part arrangements. Details are not described herein again.

The input unit 104 may include a first camera array and a second camera array, the first camera array includes multiple cameras, and the second camera array includes at least one camera.

The input unit 104 is configured to collect M first images by using the camera in the first camera array, and collect N second images by using the camera in the second camera array, where M is an integer greater than 1, and N is a positive integer. The display unit 106 is configured to display P preview images, where each preview image is obtained by synthesizing an image in the M first images and an image in the N second images collected by the input unit 104, synthesized images corresponding to different preview images are different, the synthesized image includes at least one of the following: the first image and the second image, and P is an integer greater than 1. The processor 110 is configured to obtain a corresponding final image based on a target image in the P preview images displayed by the display unit 106.

An embodiment of this application provides an electronic device. Because cameras in different camera arrays in an electronic device have different viewing positions and angles, in a process of photographing an image by the electronic device, cameras in different camera arrays are used to collect images, so that images in different ranges can be collected. In this way, when an image obtained by using a camera in a first camera array and an image obtained by a camera in a second camera array by the electronic device are synthesized into a preview image, the synthesized preview image may include an image with a larger view finding range, so that content of a final image obtained by the electronic device based on the preview image is relatively complete. In this way, according to the image photographing method provided in embodiments of this application, in an image photographing process, an image with relatively complete content can be photographed without adjusting the angle of the electronic device or the standing position of the photographed person, so that an operation of photographing an image by the electronic device can be simplified.

Optionally, the processor 110 is specifically configured to obtain the corresponding final image based on the target image in a case that the target image meets a target condition. The target condition is any one of the following: a selected input is received, display duration is greater than or equal to a first threshold, duration in which the line-of-sight of the target object stays on the target image is greater than or equal to a second threshold, or image quality is the best in the P preview images.

This embodiment of this application provides an electronic device. The received first input for the target image, the display duration of the target image, and the duration in which the line-of-sight of the target object stays on the target image may reflect that an image that a user wants to obtain is the same as the target image, and the image quality of the target image is the best in the P preview images and can reflect the best image effect of the target image. Therefore, when the electronic device obtains the corresponding final image based on the target image, an image satisfactory to the user or an image with the best image effect may be directly obtained, so that image photographing efficiency of the electronic device can be improved.

Optionally, the input unit 104 is further configured to: before collecting the M first images and collecting the N second images, collect a third image by using a first camera in the first camera array. The processor 110 is further configured to obtain a change frequency of image content of the third image. The input unit 104 is specifically configured to: in a case that the change frequency of the image content of the third image is greater than or equal to a third threshold, collect the M first images by using the camera in the first camera array, and collect the N second images by using the camera in the second camera array.

This embodiment of this application provides an electronic device. Before the electronic device collects the M first images by using the camera in the first camera array and collect the N second images by using the camera in the second camera array, the electronic device may first obtain the third image by using the first camera, and obtain the change frequency of the image content of the third image, to determine whether a single camera can collect a complete image of a to-be-photographed object, thereby avoiding starting an unnecessary camera and further reducing power consumption.

Optionally, the processor 110 is specifically configured to obtain a change frequency of target information in the image content, where the target information includes at least one of the following: a to-be-photographed object in the third image or a quantity of to-be-photographed objects in the third image.

Optionally, the electronic device includes a first screen and a second screen. The input unit 104 is specifically configured to: in a case that the change frequency of the image content of the third image is greater than or equal to the third threshold and an angle between the first screen and the second screen is greater than or equal to a fourth threshold, collect the M first images by using the camera in the first camera array, and collect the N second images by using the camera in the second camera array; where the first camera array and the second camera array are respectively distributed on the first screen and the second screen of the electronic device.

This embodiment of this application provides an electronic device. When the electronic device includes the first screen and the second screen, the angle between the first screen and the second screen may reflect viewing ranges of cameras in camera arrays distributed on different screens. Therefore, the electronic device may determine, based on the angle between the first screen and the second screen, whether to use the cameras in the camera arrays distributed on different screens together to collect an image. Therefore, a case that because the angle between the first screen and the second screen is insufficient, cameras in multiple camera arrays cannot collect a complete image of the to-be-photographed can be avoided, thereby avoiding waste of power.

Optionally, the display unit 106 is specifically configured to display the P preview images in a first display area, and arrange and display thumbnails of the P preview images in a second display area.

This embodiment of this application provides an electronic device. The electronic device may display the preview images or the thumbnails of the preview images in different display areas. Therefore, on one hand, the electronic device may clearly display these preview images to the user, and on the other hand, may display a quantity of preview images to the user, so that the user selects, from the preview images, a preview image that meets a use requirement of the preview image. In this way, the electronic device can obtain a corresponding final image based on the preview image.

Optionally, the display unit 106 is specifically configured to: obtain a line-of-sight angle of a target object in the preview image displayed in the first display area, and update display of an image in the P preview images in the first display area based on a change of the line-of-sight angle of the target object.

Optionally, the processor 110 is further configured to: before the display unit 106 displays the P preview images, combine the M first images and the N second images into P image sets, where each image set includes different first images and/or second images; and perform target processing on an image in each image set and merge processed images, to obtain the P preview images; where the target processing includes at least one of macro block de-duplication, pixel de-duplication, or de-marginalization.

This embodiment of this application provides an electronic device. The electronic device may perform target processing on images in an image set, so that a final image obtained through combination can be more natural, and quality of an image synthesized by the electronic device can be improved.

It should be noted that, in this embodiment of this application, the collection module 501 in the electronic device may be implemented by the input unit 104, and the display module 502 in the electronic device may be implemented by the display unit 106. The obtaining module 503, the combination module, the processing module, and the merging module of the electronic device may be implemented by the processor 110.

It should be understood that, in this embodiment of this application, the input unit 104 may include a graphics processing unit (GPU) 1041 and a microphone 1042. The graphics processing unit 1041 processes image data of a static picture or a video obtained by an image capture apparatus (such as a camera) in a video capture mode or an image capture mode. The display unit 106 may include a display panel 1061, and the display panel 1061 may be configured in a form of a liquid crystal display, an organic light emitting diode, or the like. The user input unit 107 includes a touch panel 1071 and another input device 1072. The touch panel 1071 is also referred to as a touchscreen. The touch panel 1071 may include two parts: a touch detection apparatus and a touch controller. The another input device 1072 may include but is not limited to one or more of a physical keyboard, a function key (such as a volume control key or an on/off key), a trackball, a mouse, a joystick, and the like. Details are not described herein. The memory 109 may be configured to store a software program and various data, including but not limited to an application program and an operating system. The processor 110 may be integrated with an application processor and a modem processor. The application processor mainly processes an operating system, a user interface, an application program, and the like, and the modem processor mainly processes wireless communication. It may be understood that the modem processor may also not be integrated into the processor 110.

An embodiment of this application further provides a readable storage medium. A program or an instruction is stored in the readable storage medium. When the program or the instruction is executed by a processor, the processes of the foregoing embodiments of the image photographing method can be implemented, and a same technical effect can be achieved. To avoid repetition, details are not described herein.

The processor is a processor in the electronic device in the foregoing embodiment. The readable storage medium includes a computer-readable storage medium such as a read-only memory (ROM), a random access memory (RAM), a magnetic disk, an optical disc, or the like.

An embodiment of this application further provides a chip. The chip includes a processor and a communication interface, the communication interface is coupled to the processor, and the processor is configured to run a program or an instruction to implement the processes of the foregoing embodiments of the image photographing method, and a same technical effect can be achieved. To avoid repetition, details are not described herein again.

It should be understood that the chip mentioned in this embodiment of this application may also be referred to as a system-level chip, a system chip, a chip system, or a system on a chip.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element. In addition, it should be noted that a scope of the method and the apparatus in the embodiments of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

According to the descriptions of the foregoing implementations, a person skilled in the art may clearly understand that the foregoing method embodiments may be implemented by using software and a required universal hardware platform, or certainly may be implemented by using hardware. However, in many cases, the former is a better implementation. Based on such an understanding, the technical solutions of this application essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of this application.

The embodiments of this application are described with reference to the accompanying drawings. However, this application is not limited to the foregoing specific implementations. The foregoing specific implementations are merely examples, but are not limiting. A person of ordinary skill in the art may make many forms without departing from the objective and the scope of the claims of this application, and these forms all fall within the protection scope of this application.

The invention claimed is:

1. An image photographing method, applied to an electronic device, wherein the electronic device comprises a first camera array and a second camera array, the first camera array comprises multiple cameras, the second camera array comprises at least one camera, and the method comprises:

collecting M first images by using the camera in the first camera array, and collecting N second images by using the camera in the second camera array, wherein M is an integer greater than 1, and N is a positive integer;

displaying P preview images, wherein each preview image is obtained by synthesizing an image in the M first images and an image in the N second images, synthesized images corresponding to different preview images are different, the synthesized image comprises at least one of the following: the first image and the second image, and P is an integer greater than 1; and obtaining a corresponding final image based on a target image in the P preview images;

wherein the final image obtained by the electronic device has the same image parameters as the target image;

wherein the obtaining a corresponding final image based on a target image in the P preview images comprises:

in a case that the target image meets a target condition, obtaining the final image based on the target image; wherein the target condition is any one of the following: a selected input is received, display duration is greater than or equal to a first threshold, duration in which a line-of-sight of a target object stays on the target image is greater than or equal to a second threshold, or image quality is the best in the P preview images.

2. The method according to claim 1, wherein before the collecting M first images by using the camera in the first camera array, and collecting N second images by using the camera in the second camera array, the method further comprises:

collecting a third image by using a first camera in the first camera array; and obtaining a change frequency of image content of the third image; and the collecting M first images by using the camera in the first camera array, and collecting N second images by using the camera in the second camera array comprises:

in a case that the change frequency of the image content of the third image is greater than or equal to a third threshold, collecting the M first images by using the camera in the first camera array, and collecting the N second images by using the camera in the second camera array.

3. The method according to claim 2, wherein the obtaining a change frequency of image content of the third image comprises:

obtaining a change frequency of target information in the image content, wherein the target information comprises at least one of the following: a to-be-photographed object in the third image or a quantity of to-be-photographed objects in the third image.

4. The method according to claim 2, wherein the electronic device comprises a first screen and a second screen; and in a case that the change frequency of the image content of the third image is greater than or equal to the third threshold, the collecting the M first images and collecting the N second images comprises:

in a case that the change frequency of the image content of the third image is greater than or equal to the third threshold and an angle between the first screen and the second screen is greater than or equal to a fourth threshold, collecting the M first images by using the camera in the first camera array, and collecting the N second images by using a camera in the second camera array; wherein the first camera array and the second camera array are respectively distributed on the first screen and the second screen of the electronic device.

5. The method according to claim 1, wherein the displaying P preview images comprises:

displaying the P preview images in a first display area, and arranging and displaying thumbnails of the P preview images in a second display area.

6. The method according to claim 5, wherein the displaying the P preview images in a first display area comprises:

obtaining a line-of-sight angle of a target object in the preview image displayed in the first display area; and updating display of an image in the P preview images in the first display area based on a change of the line-of-sight angle of the target object.

7. The method according to claim 1, wherein before the displaying P preview images, the method further comprises:

combining the M first images and the N second images into P image sets, wherein each image set comprises different first images and/or second images; and performing target processing on an image in each image set, and merging processed images to obtain the P preview images; wherein the target processing comprises at least one of macro block de-duplication, pixel de-duplication, or de-marginalization.

8. An electronic device, wherein the electronic device comprises a first camera array and a second camera array, the first camera array comprises multiple cameras, the second camera array comprises at least one camera, and the electronic device further comprises: a processor, a memory, and a program or an instruction that is stored in the memory and that can run on the processor, wherein when the program or the instruction is executed by the processor, the following steps are implemented:

collecting M first images by using the camera in the first camera array, and collecting N second images by using the camera in the second camera array, wherein M is an integer greater than 1, and N is a positive integer;

displaying P preview images, wherein each preview image is obtained by synthesizing an image in the M first images and an image in the N second images, synthesized images corresponding to different preview images are different, the synthesized image comprises at least one of the following: the first image and the second image, and P is an integer greater than 1; and obtaining a corresponding final image based on a target image in the P preview images;

wherein the final image obtained by the electronic device has the same image parameters as the target image;

wherein when the program or the instruction is executed by the processor, the following steps are further implemented:

in a case that the target image meets a target condition, obtaining the final image based on the target image; wherein the target condition is any one of the following: a selected input is received, display duration is greater than or equal to a first threshold, duration in which a line-of-sight of a target object stays on the target image is greater than or equal to a second threshold, or image quality is the best in the P preview images.

9. The electronic device according to claim 8, wherein before the collecting M first images by using the camera in the first camera array, and collecting N second images by using the camera in the second camera array, when the program or the instruction is executed by the processor, the following steps are further implemented:

collecting a third image by using a first camera in the first camera array; and obtaining a change frequency of image content of the third image; and wherein when the program or the instruction is executed by the processor, the following steps are further implemented:

in a case that the change frequency of the image content of the third image is greater than or equal to a third threshold, collecting the M first images by using the camera in the first camera array, and collecting the N second images by using the camera in the second camera array.

10. The electronic device according to claim 9, wherein when the program or the instruction is executed by the processor, the following steps are further implemented:

obtaining a change frequency of target information in the image content, wherein the target information comprises at least one of the following: a to-be-photographed object in the third image or a quantity of to-be-photographed objects in the third image.

11. The electronic device according to claim 9, wherein the electronic device comprises a first screen and a second screen; and in a case that the change frequency of the image content of the third image is greater than or equal to the third threshold, when the program or the instruction is executed by the processor, the following steps are further implemented:

in a case that the change frequency of the image content of the third image is greater than or equal to the third threshold and an angle between the first screen and the second screen is greater than or equal to a fourth threshold, collecting the M first images by using the camera in the first camera array, and collecting the N second images by using a camera in the second camera array; wherein the first camera array and the second camera array are respectively distributed on the first screen and the second screen of the electronic device.

12. The electronic device according to claim 8, wherein when the program or the instruction is executed by the processor, the following steps are further implemented:

displaying the P preview images in a first display area, and arranging and displaying thumbnails of the P preview images in a second display area.

13. The electronic device according to claim 12, wherein when the program or the instruction is executed by the processor, the following steps are further implemented:
   obtaining a line-of-sight angle of a target object in the preview image displayed in the first display area; and
   updating display of an image in the P preview images in the first display area based on a change of the line-of-sight angle of the target object.

14. The electronic device according to claim 8, wherein before the displaying P preview images, when the program or the instruction is executed by the processor, the following steps are further implemented:
   combining the M first images and the N second images into P image sets, wherein each image set comprises different first images and/or second images; and
   performing target processing on an image in each image set, and merging processed images to obtain the P preview images; wherein
   the target processing comprises at least one of macro block de-duplication, pixel de-duplication, or de-marginalization.

15. A non-transitory readable storage medium, applied to an electronic device, wherein the electronic device comprises a first camera array and a second camera array, the first camera array comprises multiple cameras, the second camera array comprises at least one camera, wherein the readable storage medium stores a program or an instruction, and when the program or the instruction is executed by a processor, the following steps are implemented:
   collecting M first images by using the camera in the first camera array, and collecting N second images by using the camera in the second camera array, wherein M is an integer greater than 1, and N is a positive integer;
   displaying P preview images, wherein each preview image is obtained by synthesizing an image in the M first images and an image in the N second images, synthesized images corresponding to different preview images are different, the synthesized image comprises at least one of the following: the first image and the second image, and P is an integer greater than 1; and
   obtaining a corresponding final image based on a target image in the P preview images;
   wherein the final image obtained by the electronic device has the same image parameters as the target image;
   when the program or the instruction is executed by the processor, the following steps are further implemented:
   in a case that the target image meets a target condition, obtaining the final image based on the target image; wherein
   the target condition is any one of the following: a selected input is received, display duration is greater than or equal to a first threshold, duration in which a line-of-sight of a target object stays on the target image is greater than or equal to a second threshold, or image quality is the best in the P preview images.

16. The non-transitory readable storage medium according to claim 15, wherein before the collecting M first images by using the camera in the first camera array, and collecting N second images by using the camera in the second camera array, when the program or the instruction is executed by the processor, the following steps are further implemented:
   collecting a third image by using a first camera in the first camera array; and
   obtaining a change frequency of image content of the third image; and
   when the program or the instruction is executed by the processor, the following steps are further implemented:
   in a case that the change frequency of the image content of the third image is greater than or equal to a third threshold, collecting the M first images by using the camera in the first camera array, and collecting the N second images by using the camera in the second camera array.

17. The non-transitory readable storage medium according to claim 16, when the program or the instruction is executed by the processor, the following steps are further implemented:
   obtaining a change frequency of target information in the image content, wherein the target information comprises at least one of the following: a to-be-photographed object in the third image or a quantity of to-be-photographed objects in the third image.

* * * * *